United States Patent [19]

Brown

[11] Patent Number: 5,040,988

[45] Date of Patent: Aug. 20, 1991

[54] VISUAL MOOD AND CAUSE INDICATOR APPARATUS AND METHOD

[76] Inventor: Paul R. Brown, P.O. Box 472, Vinalhaven, Me. 04863

[21] Appl. No.: 528,836

[22] Filed: May 24, 1990

[51] Int. Cl.$^5$ .............................................. G09F 9/00
[52] U.S. Cl. .................................... 434/236; 434/238
[58] Field of Search ............... 434/236, 238, 107–109, 434/407, 430, 429, 958; 116/200, 201, 325, 326; 40/584, 595, 596, 579

[56] References Cited

U.S. PATENT DOCUMENTS

| | | |
|---|---|---|
| 1,138,325 | 5/1915 | Snyder . |
| 2,965,978 | 12/1960 | Olson .................................. 434/238 |
| 3,691,652 | 9/1972 | Clynes .................................. 35/22 R |
| 3,779,557 | 12/1973 | Kritzberg et al. ................... 434/236 |
| 4,108,311 | 8/1978 | McClendon ........................ 206/573 |
| 4,344,759 | 8/1982 | Albert ................................. 434/236 |
| 4,741,701 | 5/1988 | Kossor ................................ 434/238 |
| 4,795,348 | 1/1989 | Garthwaite ..................... 434/430 X |

Primary Examiner—Richard J. Apley
Assistant Examiner—Glenn E. Richman
Attorney, Agent, or Firm—Limbach, Limbach & Sutton

[57] ABSTRACT

A visual mood and cause indicator apparatus and method are provided wherein a display board with indicia on the face thereof is used to visually communicate human moods and possible causes therefor. A person's mood is visually communicated by displaying a colored symbol, such as a flag or an illuminated lamp, in a designated location on the display board. The perceived cause for such a mood is visually communicated by displaying a marker, such as a peg or an illuminated lamp, next to the indicia corresponding thereto. Further indicia can be provided on the face of the display board which represents desirable actions considered responsive to the indicated mood, with the desired action being visually communicated by displaying a second marker, such as another peg or illuminated lamp, next to the indicia corresponding thereto.

10 Claims, 2 Drawing Sheets

VISUAL MOOD AND CAUSE INDICATOR APPARATUS AND METHOD

TECHNICAL FIELD

The present invention relates generally to an apparatus to enable individuals to communicate regarding their feelings and emotions, and particularly, to visual aid devices which permit individuals to communicate their feelings and emotions without talking.

BACKGROUND OF THE INVENTION

It is generally recognized and accepted that honest and open communication of feelings and emotions is at once both beneficial and yet difficult for most people to do. Among the benefits from such communication is the diffusion of negative emotions by the reason and logic introduced by the conscious recognition of one's emotional frame of mind and identification of the perceived cause therefor. The difficulty a person typically faces in communicating his feelings and emotions to others begins with the difficulty in first recognizing them. The mere fact that the person is experiencing negative feelings or emotions often makes it difficult to think sufficiently clearly or logically to recognize the specific feelings or emotions which are being experienced. Even if the feelings or emotions are recognized, they can still cloud the person's reason and logic, preventing identification of the cause for such feelings or emotions.

The difficulty in communication of the feelings and their perceived cause becomes compounded when communication of these feelings or emotions and their perceived cause is inhibited by fears of a verbal confrontation or reprisal. This is particularly true in the case of couples, such as spouses, where one spouse will avoid communicating his or her negative feelings or emotions and their perceived cause for fear of making matters worse with a verbal confrontation.

Therefore, a need exists for a device which first encourages an individual to consciously recognize his feelings and emotions, to identify the perceived cause for such feelings or emotions and, perhaps even more importantly, to effectively communicate those feelings or emotions and their perceived causes to others without fear of a verbal confrontation or reprisal.

SUMMARY OF THE INVENTION

A visual mood and cause indicator in accordance with the present invention provides an apparatus with which a person is assisted in consciously recognizing his or her feelings or emotions, i.e., mood, and identifying the perceived cause for such mood. The person is encouraged to communicate such mood and its perceived cause through the use of visual aids which provide such communication without requiring any verbal exchanges.

A visual mood and cause indicator in accordance with the present invention has a display board upon which indicators specifically identifying a person's mood and the perceived cause for such mood are visually displayed. Further provided is an indicator by which the person can communicate a responsive action which he or she deems desirable.

The indicator for communicating a person's mood consists of multiple symbols of different colors, such as flags or illuminated lamps, from which the symbol having the color corresponding to a particular mood is selected and displayed along the top edge of the display board. The indicator for communicating the perceived cause for such a mood consists of multiple indicia, such as printed words or phrases, representing multiple potential causes for a number of various moods. These indicia are arranged in columns on the face of the display board and one is selectively identified by displaying adjacent thereto a marker, such as a peg or illuminated lamp.

Similarly, a responsive action deemed desirable by the person whose mood and perceived cause therefor are indicated, can also be communicated. The indicator for communicating such actions consists of multiple indicia, such as words or phrases, describing numerous potential actions responsive to a displayed mood. These indicia are arranged in a column on the face of the display board and one is selectively identified by displaying adjacent thereto a marker, such as a peg or illuminated lamp.

Thus, a visual mood and cause indicator in accordance with the present invention helps an individual in consciously recognizing their mood and identifying the perceived cause therefor. The present invention further helps the individual in identifying a responsive action to be taken on the part of another, such as their spouse, which they deem desirable. Further, the present invention helps the individual by providing a means by which effective communication of the foregoing can be achieved without fear of verbal confrontations.

These and other objectives, features and advantages of the present invention will be understood upon consideration of the following detailed description of the invention and the accompanying drawings.

BRIEF DESCRIPTION OF THE DRAWINGS

Throughout the figures, corresponding elements are designated with similar numerals.

DETAILED DESCRIPTION OF THE INVENTION

Figure 1:
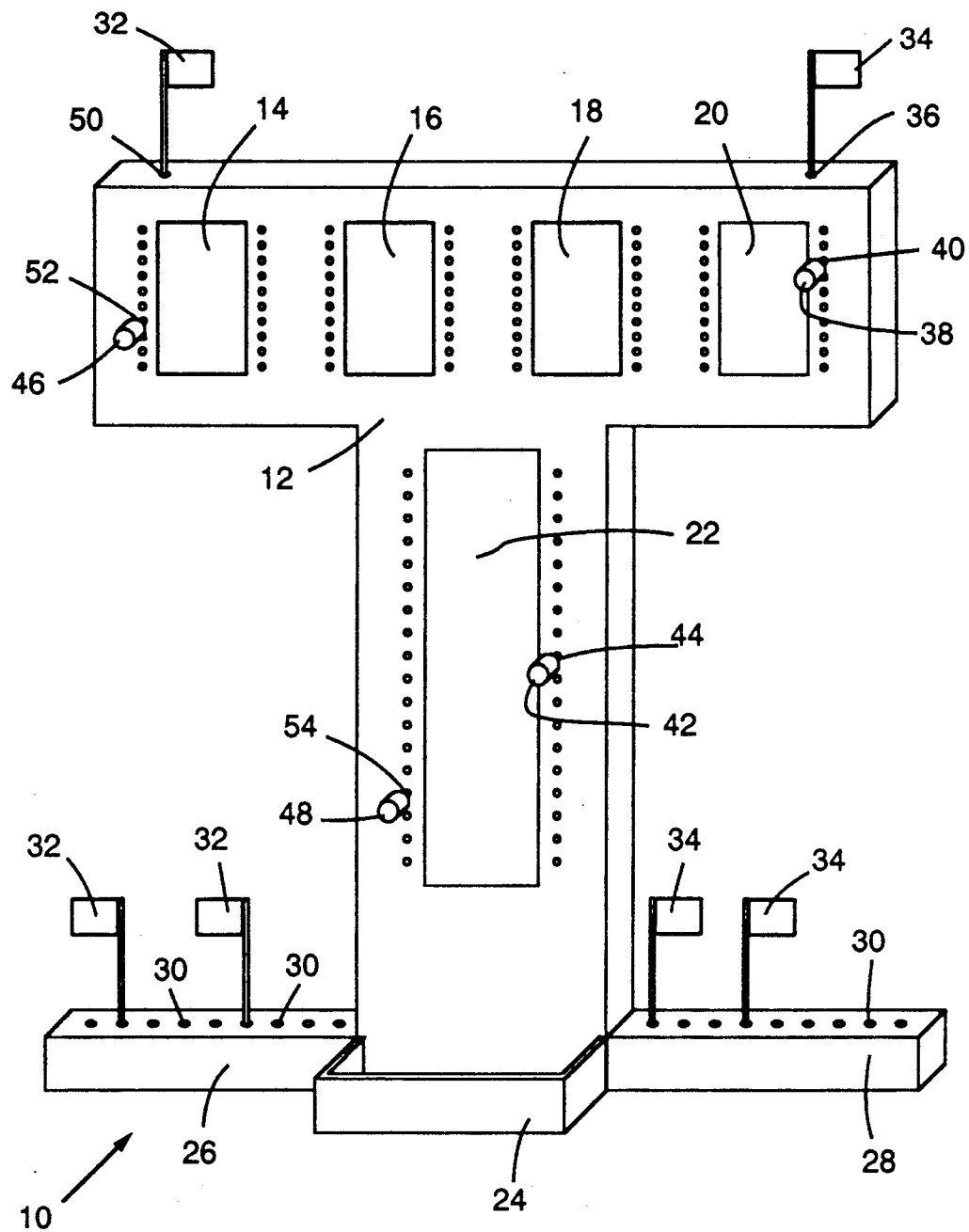
FIG. 1 illustrates a perspective view of a preferred embodiment of the visual mood and cause indicator in accordance with the present invention.

Referring to FIG. 1, a preferred embodiment 10 of the visual mood and cause indicator in accordance with the present invention comprises a main display board 12 upon which areas 14–22 of printed matter are displayed. The upper areas 14–20 of printed matter contain words or phrases indicating a selectable number of perceived causes for various possible moods that a person can experience (see examples in Tables 1 and 2 below). The lower area 22 of printed matter displays words or phrases indicating a selectable number of responsive actions which a person may deem desirable (see examples in Table 3 below).

TABLE 1

| Examples of Possible Moods | |
|---|---|
| Happy | Bored |
| Fine/Okay | Frustrated |
| Grouchy | Sad |
| Angry | Nervous/Anxious |
| Tired | |

TABLE 2

Examples of Perceived Mood Causes

| | | | |
|---|---|---|---|
| Shopping | Free Time | Weather | Relatives |
| Clerks | Yard Work | Health | Clothes |
| Traffic | Car Repairs | Everything | Friends |
| Service People | Goals | Money | Recreation |
| Way of Life | Phone | Vacation | Spouse |
| Ambitions | Neighbors | Housework | Schedules |
| Social | Behavior | Cooking | Diet |
| Religion | Commuting | Living Space | T.V. |
| Romance | Pets | Job | |
| Companionship | Environment | Communicating | |

TABLE 3

Examples of Responsive Actions

| | |
|---|---|
| I Won't Play | I Surrender |
| Let's Make Up | Leave Me Alone |
| Patience | Don't Speak to Me |
| Let's Talk | Be Nice to Me |
| Let's Get Help | Let's Do Something Together |
| Fix It | Affection |
| Not Negotiable | |
| Don't Be Unhappy Too-That Won't Help | |

Near the bottom of the main display board 12 is a receptacle 24 (discussed below) and two laterally extending platforms 26,28. The platforms 26,28 each contain a number of holes 30 into which identical sets of flags 32,34 can be inserted. Each set of flags 32,34 consists of a number of flags of different colors, each color representing a different mood (e.g., red for anger, blue for sadness, etc.). Two sets 32,34 of flags are available so that the visual mood and cause indicator 10 as illustrated can be used by two people simultaneously for communicating their moods, as well as the perceived causes therefor and responsive actions they deem desirable.

A person wishing to communicate their mood selects a flag 34 having the color corresponding to that mood and places it in a hole 36 at the top of the main display board 12 on the same side as that person's set of flags 34. For example, a red flag 34 can be selected and placed in the hole 36 for communicating an angry mood on the part of the person selecting the flag 34.

To indicate the perceived cause for such a mood, the person places a small peg 38, several of which can be stored in the receptacle 24 at the bottom of the main display board 12, into a hole 40 alongside the word or phrases in the area 20 of printed matter which best describes such cause. As with the placement of the flag 34 in the top hole 36, the peg 38 is placed in the hole 40 lying on the same side of the area 20 of printed matter as the set of flags 34 corresponding to the individual using those flags 34.

Similarly, to indicate the desired action responsive to such a mood, the person places another peg 42, also retrieved from the receptacle 24, in a hole 44 adjacent the word or phrase contained within the area 22 of printed matter which indicates the desired responsive action. Once the foregoing acts have been completed, a person's mood, the perceived cause for such mood and the action they believe to be responsive and desirable can be communicated visually without requiring any verbal exchanges or confrontations between that person and the one to whom the communication is directed.

Similarly, if another person, such as the first person's spouse, wishes to also communicate their mood, its perceived cause and a responsive action, they can do so simultaneously by inserting a flag 32 from their set of flags 32 and pegs 46,48 into the appropriate holes 50,52,54 (as discussed above).

As will be recognized by one of ordinary skill in the art, the pegs 38,42,46,48 can also be color coded as appropriate so as to indicate the individual whose perceived mood cause and desired responsive action are being indicated.

Figure 2:
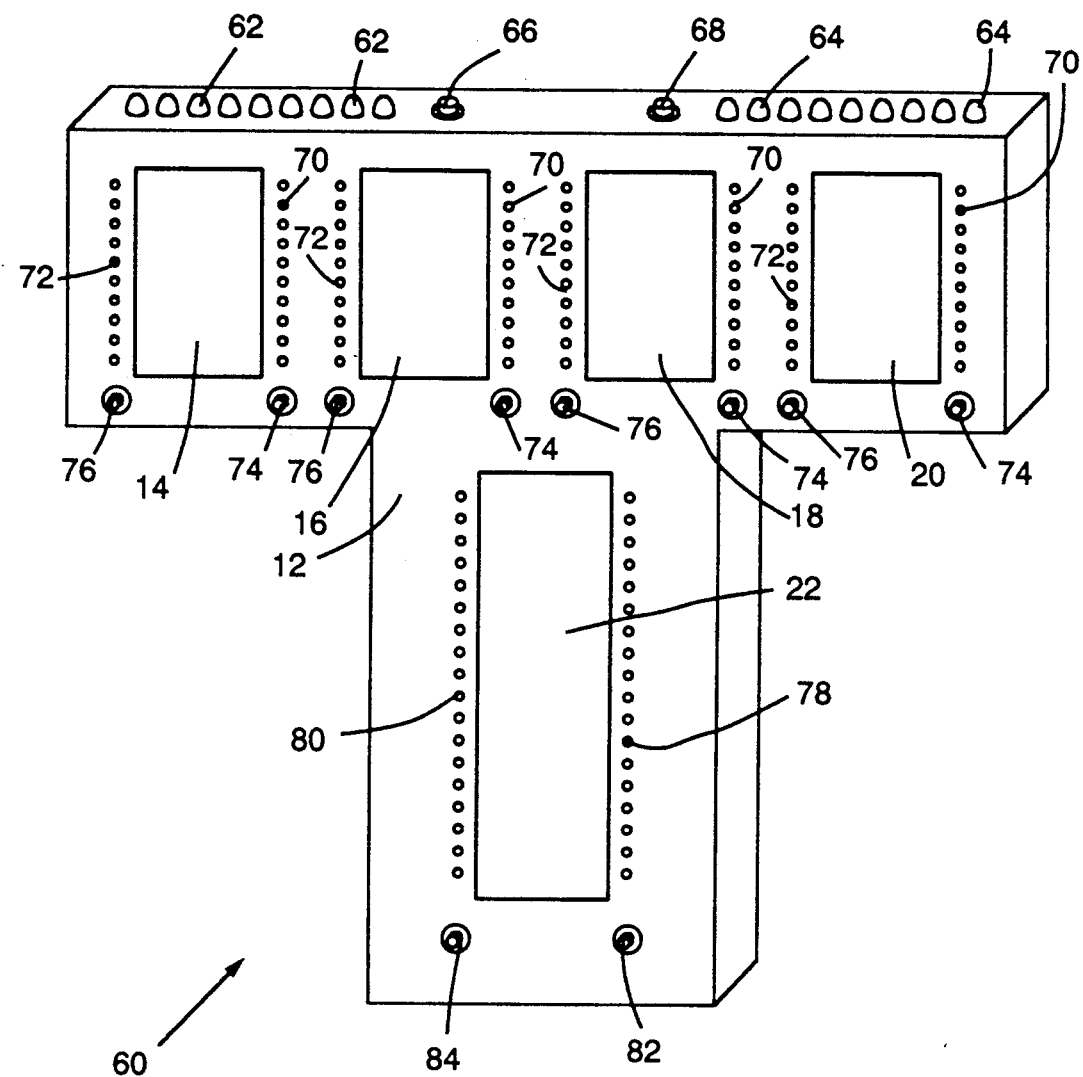
FIG. 2 illustrates a perspective view of an alternative embodiment of the visual mood and cause indicator in accordance with the present invention.

Referring to FIG. 2, an alternative embodiment 60 of the visual mood and cause indicator in accordance with the present invention uses colored lamps 62,64 in place of the colored flags 32,34 of FIG. 1. Similar to the embodiment 10 of FIG. 1, the appropriate color corresponding to a person's mood is selected and the appropriate lamp 62,64 can be lit by means known in the art by selecting the desired lamp 62,64 by way of electrical switches 66,68. For example, a red lamp can be selectively lit for communicating an angry mood on the part of the person lighting the lamp.

Similarly, the words or phrases located in the areas 14–20 of printed matter representing perceived causes for a person's mood can be indicated by illuminating the corresponding lamps 70,72, as selected by electrical switches 74,76. Further similarly, the desired responsive actions, as represented by words or phrases in the lower area 22 of printed matter, can be indicated by illuminating the appropriate lamps 78,80, as selected by electrical switches 82,84.

As will be recognized by one of ordinary skill in the art, the display board 12 can be of virtually any size or shape as desired. For example, other than I-shaped or T-shaped as illustrated in FIGS. 1 or 2, respectively, the display board 12 can be rectangular, triangular or even some completely asymmetrical shape, as desired.

The colored lamps 62,64,70,72,78,80 can be coupled by any of several means known in the art (e.g., permanently installed and wired, or insertable into sockets). Furthermore, the flags 32,34, pegs 38,42,46,48 and lamps 62,64,70,72,78,80 can be interchanged or replaced by other types of visual indicators or markers, such as pins or posts, as desired. Moreover, such alternative indicators or markers can be attached or otherwise coupled to the display board 12 by any of several other means known in the art, such as magnetically, with fastening tape (e.g., Velcro ®), or with glue (e.g., Post-Its ®).

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. An apparatus for visually communicating the mood of a person, a perceived cause therefor and a desired action responsive to said mood, said apparatus comprising:

a substrate comprising a symbol receptacle, a plurality of cause marker receptacles, a plurality of action marker receptacles, a plurality of cause indicia representing causes for a mood of a human being, and a plurality of action indicia representing actions responsive to said mood causes, said plurality of cause marker receptacles being disposed adjacent to and associated with said plurality of cause indicia, and said plurality of action marker receptacles being disposed adjacent to and associated with said plurality of action indicia;

a mood indicator comprising a symbol selectable from among a plurality of symbols, each symbol being uniquely associated with and representative of a mood, said selectable symbol being coupleable with said substrate symbol receptacle;

a cause indicator comprising a cause marker selectively coupleable with one of said plurality of cause marker receptacles; and an action indicator comprising an action marker selectively coupleable with one of said plurality of action marker receptacles;

wherein said person may communicate his mood or feelings, the perceived cause therefor and a desired action responsive thereto by selecting a symbol indicative of his mood and coupling it with said substrate symbol receptacle, coupling said cause marker with a cause marker receptacle adjacent to and associated with said cause indicia corresponding to said perceived mood cause, and coupling said action marker with an action marker receptacle adjacent to and associated with said action indicia corresponding to said responsive action.

2. An apparatus as recited in claim 1, wherein said plurality of symbols comprises a plurality of colored flags detachably coupleable with said symbol receptacle.

3. An apparatus as recited in claim 2, wherein said plurality of symbols comprises a plurality of selectively illuminated colored lamps coupled to said symbol receptacle.

4. An apparatus as recited in claim 3, wherein said cause marker comprises a peg detachably coupleable with one of said plurality of cause marker receptacles.

5. An apparatus as recited in claim 4, wherein said cause marker comprises a selectively illuminated lamp coupled to one of said plurality of cause marker receptacles.

6. An apparatus as recited in claim 5, wherein said action marker comprises a peg detachably coupleable with one of said plurality of action marker receptacles.

7. An apparatus as recited in claim 6, wherein said action marker comprises a selectively illuminated lamp coupled to one of said plurality of action marker receptacles.

8. A method for visually communicating the mood of a person, the perceived cause therefor and a desired action responsive to said mood, said method comprising the steps of:

selecting a symbol indicative of a mood;

coupling said selected symbol with a symbol receptacle on a substrate comprising said symbol receptacle, a plurality of cause marker receptacles, a plurality of action marker receptacles, a plurality of cause indicia representing causes for a mood of a human being, and a plurality of action indicia representing actions responsive to said mood causes, wherein said plurality of cause marker receptacles are disposed adjacent to and associated with said plurality of cause indicia, and further wherein said plurality of action marker receptacles are disposed adjacent to and associated with said plurality of action indicia;

selecting a cause marker;

coupling said selected cause marker with a cause marker receptacle adjacent to and associated with said cause indicia corresponding to a perceived cause for said mood;

selecting an action marker; and coupling said selected action marker with an action marker receptacle adjacent to and associated with said action indicia corresponding to a desired action responsive to said perceived mood cause.

9. An apparatus for visually communicating the respective moods of a plurality of persons, perceived causes therefor and desired actions responsive to said moods, said apparatus comprising:

a substantially I-shaped substrate comprising elongate, horizontal top and bottom members and an elongate, vertical center member, said top and bottom members each having top edges, and said top and center members each having front surfaces;

left and right flag receptacles disposed near opposite ends of said top edges of said substrate top and bottom members;

a plurality of selectable, colored flags, each flag being uniquely associated with and representative of a mood, said selectable flag being engagable with said flag receptacles;

a plurality of cause indicia representing causes for a mood of a human being, said plurality of cause indicia being disposed on said front surface of said substrate top member;

first and second pluralities of cause marker receptacles, said first and second pluralities of cause marker receptacles being disposed on said substrate top member adjacent to and respectively associated with said plurality of cause indicia;

a plurality of cause markers selectively engagable with said plurality of cause marker receptacles;

a plurality of action indicia representing actions responsive to said mood causes, said plurality of action indicia being disposed on said front surface of said substrate center member;

first and second pluralities of action marker receptacles, said first and second pluralities of action marker receptacles being disposed on said substrate center member adjacent to and respectively associated with said plurality of action indicia; and a plurality of action markers selectively engagable with said plurality of action marker receptacles;

wherein said persons may communicate their respective moods or feelings, the perceived causes therefor and desired actions responsive thereto by each selecting a flag indicative of his mood and engaging it with one of said flag receptacles, engaging a cause marker in a cause marker receptacle adjacent to and associated with said cause indicia corresponding to said perceived mood cause, and engaging an action marker in an action marker receptacle adjacent to and associated with said action indicia corresponding to said responsive action.

10. An apparatus for visually communicating the respective moods of a plurality of persons, perceived causes therefor and desired actions responsive to said moods, said apparatus comprising:

a substantially T-shaped substrate comprising an elongate, horizontal top member and an elongate, vertical center member, said top member having a top edge, and said top and center members each having front surfaces;

left and right pluralities of colored lamps disposed near opposite ends of said top edge of said substrate top member;

means for selectively illuminating said left and right pluralities of colored lamps;

a plurality of cause indicia representing causes for a mood of a human being, said plurality of cause indicia being disposed on said front surface of said substrate top member;

first and second pluralities of cause marker lamps, said first and second pluralities of cause marker lamps being disposed on said substrate top member adjacent to and respectively associated with said plurality of cause indicia;

means for selectively illuminating said cause marker lamps;

a plurality of action indicia representing actions responsive to said mood causes, said plurality of action indicia being disposed on said front surface of said substrate center member;

first and second pluralities of action marker lamps, said first and second pluralities of action marker lamps being disposed on said substrate center member adjacent to and respectively associated with said plurality of action indicia; and means for selectively illuminating said action marker lamps;

wherein said persons may communicate their respective moods or feelings, the perceived causes therefor and desired actions responsive thereto by each selectively illuminating a colored lamp, selectively illuminating a cause marker lamp adjacent to and associated with said cause indicia corresponding to said perceived mood cause, and selectively illuminating an action marker lamp adjacent to and associated with said action indicia corresponding to said responsive action.

* * * * *